(12) United States Patent
Hsieh et al.

(10) Patent No.: US 10,996,498 B2
(45) Date of Patent: May 4, 2021

(54) DISPLAY APPARATUS WITH TOUCH SENSING AND FORCE SENSING FUNCTIONS

(71) Applicant: AU OPTRONICS CORPORATION, Hsin-chu (TW)

(72) Inventors: Yi-San Hsieh, Hsin-chu (TW); Shih-Lun Lai, Hsin-chu (TW); Wen-Chang Hsieh, Hsin-chu (TW); I-Hsiung Huang, Hsin-chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 628 days.

(21) Appl. No.: 15/267,256

(22) Filed: Sep. 16, 2016

(65) Prior Publication Data
US 2017/0322662 A1    Nov. 9, 2017

(30) Foreign Application Priority Data
May 6, 2016    (TW) .................. 105114050

(51) Int. Cl.
*G06F 3/041*    (2006.01)
*G06F 3/044*    (2006.01)
(Continued)

(52) U.S. Cl.
CPC ....... *G02F 1/13338* (2013.01); *G02B 6/0088* (2013.01); *G02F 1/133305* (2013.01);
(Continued)

(58) Field of Classification Search
CPC .................. G06F 3/0414; G06F 3/0416; G06F 2203/04105; G06F 3/04166; G06F 3/0446;
(Continued)

(56) References Cited

U.S. PATENT DOCUMENTS

2010/0164896 A1*    7/2010    Nakayama ............ G06F 3/0445
345/173
2015/0070604 A1*    3/2015    Chen .................... G06F 3/0443
349/12
(Continued)

FOREIGN PATENT DOCUMENTS

CN    105068695 A    11/2015
CN    150608695 A    11/2015
(Continued)

OTHER PUBLICATIONS

Office Action issued by (TIPO) Intellectual Property Office, Ministry of Economic Affairs, R. O. C. dated Jan. 12, 2017 for Application No. 105114050, Taiwan.
(Continued)

*Primary Examiner* — Stephen S Hong
*Assistant Examiner* — Ahamed I Nazar
(74) *Attorney, Agent, or Firm* — Locke Lord LLP; Tim Tingkang Xia, Esq.

(57) ABSTRACT

A display apparatus with touch sensing and force sensing functions includes a display panel, a first touch device, a conductive layer and a dielectric layer. The first touch device includes multiple touch sensing pads. The conductive layer includes multiple force sensing pads electrically connected to each other, where the touch sensing pads separately overlap the corresponding force sensing pads in a vertical projection direction. The dielectric layer is disposed between the conductive layer and the first touch device. The touch sensing pads, the dielectric layer and the force sensing pads form a force sensing device.

6 Claims, 17 Drawing Sheets

(51) Int. Cl.
  *G02F 1/1333* (2006.01)
  *F21V 8/00* (2006.01)
(52) U.S. Cl.
  CPC ...... *G02F 1/133308* (2013.01); *G06F 3/0412* (2013.01); *G06F 3/0446* (2019.05); *G06F 3/04166* (2019.05); *G06F 3/04144* (2019.05); *G06F 2203/04105* (2013.01); *G06F 2203/04112* (2013.01)
(58) Field of Classification Search
  CPC ............... G06F 3/0412; G06F 3/04144; G06F 2203/04112; G06F 3/044; G06F 2203/04111; G02F 1/13338; G02F 1/133305; G02F 1/133308; G02B 6/0088; G02B 6/0083
  See application file for complete search history.

(56) References Cited

U.S. PATENT DOCUMENTS

| | | | |
|---|---|---|---|
| 2015/0091856 A1 | 4/2015 | Park et al. | |
| 2015/0145824 A1* | 5/2015 | Park | G06F 3/0445 345/174 |
| 2015/0277185 A1* | 10/2015 | Nam | G02F 1/133512 349/58 |
| 2015/0363019 A1* | 12/2015 | Schediwy | G06F 3/044 345/174 |
| 2017/0068368 A1* | 3/2017 | Hsiao | G06F 3/0416 |
| 2017/0148866 A1* | 5/2017 | Yamazaki | H01L 27/3293 |
| 2017/0192579 A1* | 7/2017 | Kim | G06F 3/0443 |
| 2017/0199610 A1* | 7/2017 | Kitchens, II | G06F 3/0412 |
| 2017/0235414 A1 | 8/2017 | Ding et al. | |
| 2017/0242524 A1* | 8/2017 | Kim | G06F 3/0412 |
| 2017/0277351 A1* | 9/2017 | Lee | G06F 3/0416 |
| 2018/0081463 A1 | 3/2018 | Zhang et al. | |

FOREIGN PATENT DOCUMENTS

| | | |
|---|---|---|
| CN | 105549251 A | 5/2016 |
| EP | 2224313 A1 | 9/2010 |
| TW | M520681 U | 4/2016 |

OTHER PUBLICATIONS

Office Action issued by the State Intellectual Property Office of the Peoples Republic of China dated Aug. 2, 2018 for Application No. CN201610431054.2.

* cited by examiner

DISPLAY APPARATUS WITH TOUCH SENSING AND FORCE SENSING FUNCTIONS

CROSS-REFERENCE TO RELATED APPLICATION

This non-provisional application claims priority to and benefit of, under 35 U.S.C. § 119(a), Patent Application No. 105114050 filed in Taiwan R.O.C. on May 6, 2016, the entire content of which is hereby incorporated by reference.

BACKGROUND

Technical Field

The present invention relates to a display apparatus, and in particular, to a display apparatus with touch sensing and force sensing functions.

Related Art

Due to the feature of human computer interaction of touch panels, the touch panels gradually replace keyboards and are widely used in input interfaces of electronic apparatuses. Recently, with the increasing development of applications of consumer electronics products, application products that combine touch panels with display apparatuses to form touch display apparatuses are increasing. The products include mobile phone (mobile phone), GPS navigator system (GPS navigator system), tablet PC (tablet PC), laptop PC (laptop PC), and the like.

The current development of touch panel technologies is very diverse. Capacitive touch panels become a main touch technology used in current middle-range and high-end consumer electronics products due to features such as high accuracy, multi-touch, and high touch resolution. However, only a single one instruction is executed in response to a detection of a touch position, and cannot further execute another instruction by means of a touch operation. Therefore, in the current development, a force sensor is additionally arranged, so as to simultaneously detect a force that is applied by a touch, and execute a corresponding instruction according to the force. However, the design of the additional force sensor causes increases of size and weight of a display apparatus. Therefore, a requirement of reducing size and weight of a display apparatus is permanent.

SUMMARY

One of the objectives of the present invention is to provide a display apparatus with touch sensing and force sensing functions.

To achieve the foregoing objective, the present disclosure provides a display apparatus with touch sensing and force sensing functions, including: a display panel, a first touch device, a conductive layer and a dielectric layer. The first touch device includes touch sensing pads. The conductive layer includes force sensing pads electrically connected to each other, where the touch sensing pads respectively overlap the corresponding force sensing pads in a vertical projection direction. The dielectric layer is disposed between the conductive layer and the first touch device, and the touch sensing pads, the dielectric layer and the force sensing pads form a force sensing device.

To achieve the foregoing objective, the present disclosure further provides a display apparatus with touch sensing and force sensing functions, including: a display panel, a first touch device, a conductive layer and a dielectric layer. The display panel has pixels. The first touch device overlaps at least one of the pixels, and the first touch device includes touch sensing pads. The conductive layer overlaps at least one of the pixels, and the conductive layer includes force sensing pads electrically connected to each other. The dielectric layer is disposed between the conductive layer and the first touch device, and the touch sensing pads, the dielectric layer and the force sensing pads form a force sensing device.

To achieve the foregoing objective, the present disclosure further provides a method for driving a display apparatus with touch sensing and force sensing functions, including: providing the foregoing display apparatus with touch sensing and force sensing functions; in a force detection period, providing a common signal to the conductive layer, and detecting, by using the first touch device, a force sensing signal corresponding to a force; and in a touch detection period, transmitting at least one touch drive signal to the first touch device, and detecting at least one touch sensing signal from the first touch device, where the force detection period does not overlap the touch detection period.

To achieve the foregoing objective, the present disclosure further provides a method for driving a display apparatus with touch sensing and force sensing functions, including: providing the foregoing display apparatus with touch sensing and force sensing functions, where the display apparatus with touch sensing and force sensing functions further includes a second touch device, the first touch device is disposed outside the display panel, and the second touch device is disposed in the display panel; in a force detection period, providing a common signal to the conductive layer, and detecting, by using the first touch device, a force sensing signal corresponding to a force; and in a touch detection period, transmitting at least one touch drive signal to the second touch device, and detecting at least one touch sensing signal from the second touch device.

DETAILED DESCRIPTION

Figure 1:
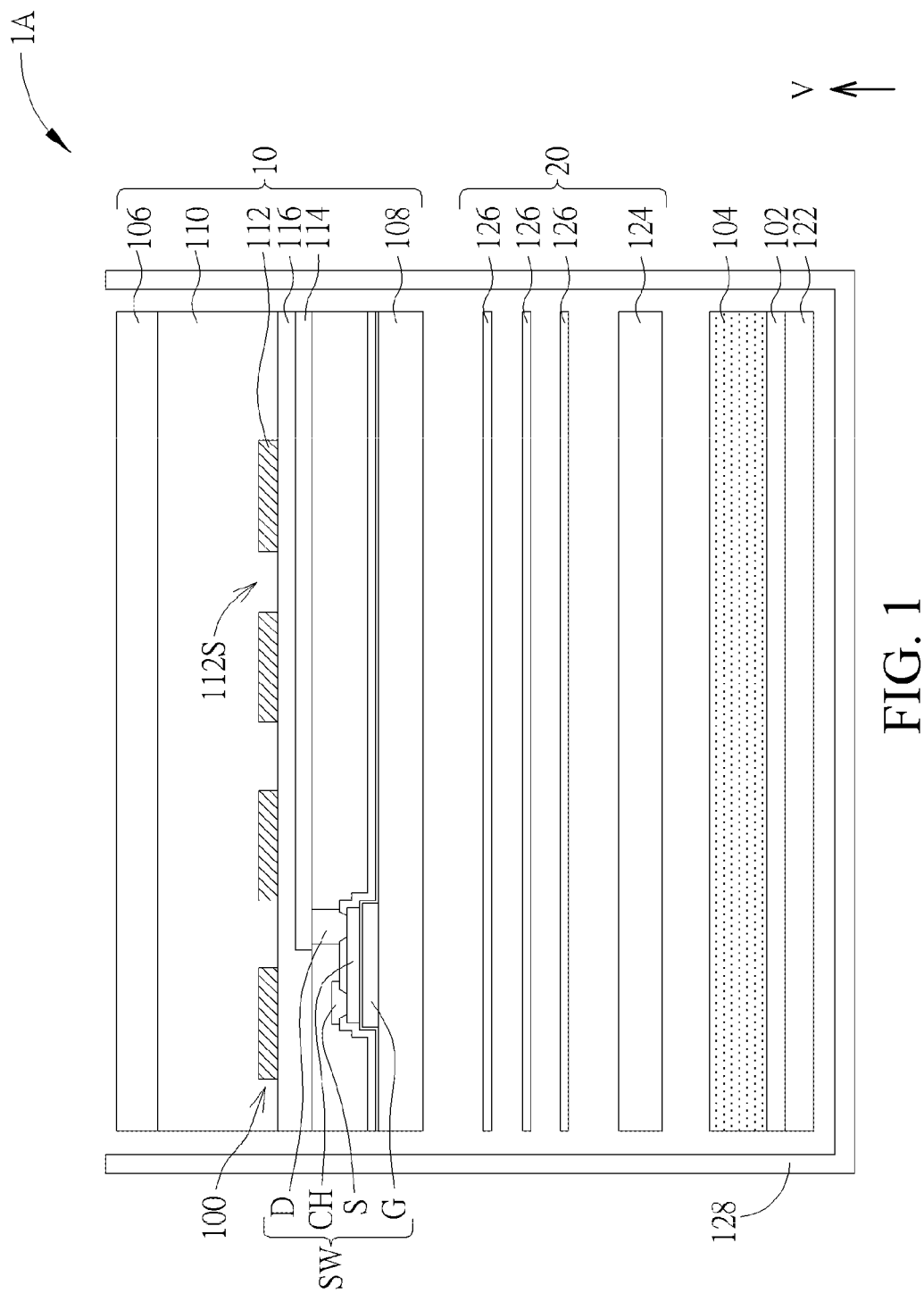
FIG. 1 is a schematic diagram of a display apparatus with touch sensing and force sensing functions according to a first embodiment of the present invention.

To make a person of ordinary skill in the art further understand the present invention, content and to-be-achieved effects of the present invention are described in detail below through exemplary embodiments with reference to the accompanying drawings. Besides, to highlight features of the present invention, a display apparatus with touch sensing and force sensing functions in the drawings is drawn in a schematic manner, and a detailed scale thereof is not limited to the drawings.

Referring to FIG. 1, FIG. 1 is a schematic diagram of a display apparatus with touch sensing and force sensing functions according to a first embodiment of the present invention. For ease of description, FIG. 1 merely draws some elements of the display apparatus with touch sensing and force sensing functions 1A, and merely draws one subpixel thereof, so as to clearly represent the main spirit of this embodiment. As shown in FIG. 1, the display apparatus with touch sensing and force sensing functions 1A of this embodiment includes a display panel 10, a backlight module 20, a first touch device 100, a conductive layer 102 and dielectric layer. The dielectric layer is an elastic dielectric layer 104, for example. The backlight module 20 is disposed between the display panel 10 and the conductive layer 102. Alternatively, the backlight module 20 may be disposed between the display panel 10 and the elastic dielectric layer 104. The first touch device 100 is disposed in the display panel 10. The display panel 10 includes a first substrate 106, a second substrate 108, and a display medium layer 110 disposed between the first substrate 106 and the second substrate 108. The first substrate 106 and the second substrate 108 may include a transparent substrate, such as a glass substrate or a plastic substrate, but the present invention is not limited thereto. The display medium layer 110 of this embodiment is a liquid crystal layer, but the present invention is not limited thereto. Alternatively, depending on a different type of display panel 10, the display medium layer 100 may be another display medium layer, for example, an electrophoretic material layer, an electrowetting material layer, or the like. If the display medium layer 110 is a self-luminous layer, for example, an electroluminescent material layer, the arrangement of the backlight module 20 may be selectively omitted. The display panel 10 further includes first electrodes 112, second electrodes 114 and an insulation layer 116 that are disposed between the display medium layer 110 and the second substrate 108. The insulation layer 116 is disposed between the first electrodes 112 and the second electrodes 114. In this embodiment, the first electrodes 112 may be used as common electrodes, and the second electrodes 114 may be used as pixel electrodes, where each of the common electrodes has at least one slit 112S, and each of the second electrodes 114 does not have a slit, but the present invention is not limited thereto. Each of the first electrodes 112 or each of the second electrodes 114 may have a slit or does not have a slit. In another variant embodiment, the first electrodes 112 may be used as pixel electrodes, and the second electrodes 114 may be used as common electrodes. In other words, the display panel 10 of this embodiment is a fringe field switching type liquid crystal display panel, but the present invention is not limited thereto, and a display panel of the present invention may be another type of liquid crystal display panel. The first electrodes 112 and the second electrodes 114 may be separately formed by a transparent conductive layer, a material of the transparent conductive layer may be indium tin oxide (indium tin oxide, ITO), indium zinc oxide (indium zinc oxide, IZO), or another transparent conductive material with high light-transmission property and good conductivity. A material of the insulation layer 116 may include an inorganic dielectric material such as silicon nitride, silicon oxide or silicon oxynitride, an organic dielectric material, an organic/inorganic hybrid dielectric material, or a combination of the foregoing materials.

Besides, the display panel 10 of this embodiment may further include gate lines (not shown) and data lines (not shown) that are disposed on the second substrate 108. The gate lines and the data lines may intersect to form pixels. Each pixel is provided with an active component SW, and the active component SW is electrically connected to gate lines and data lines that define the pixel at which the active component SW is located. The active component SW of this embodiment is a thin film transistor, and is disposed on the second substrate 108. The thin film transistor of this embodiment is a bottom gate type thin film transistor, but the present invention is not limited thereto. Alternatively, the thin film transistor may be another type of thin film transistor. The thin film transistor may include a gate G, a source S, a drain D, and a semiconductor layer CH. The gate G is electrically connected to a corresponding gate line. The source S is electrically connected to a corresponding data line. The drain D is electrically connected to a second electrode 114. In another variant embodiment, if the first electrodes 112 are used as pixel electrodes, a drain D of an active component SW is electrically connected to a first electrode 112. The display panel 10 may include a storage capacitor, an alignment film, a black matrix, a color filter layer, and the other display elements that the display panel 10 needs. The functions and configurations of the foregoing elements are known to a person skilled in the art, and details are not described herein.

Figure 2:
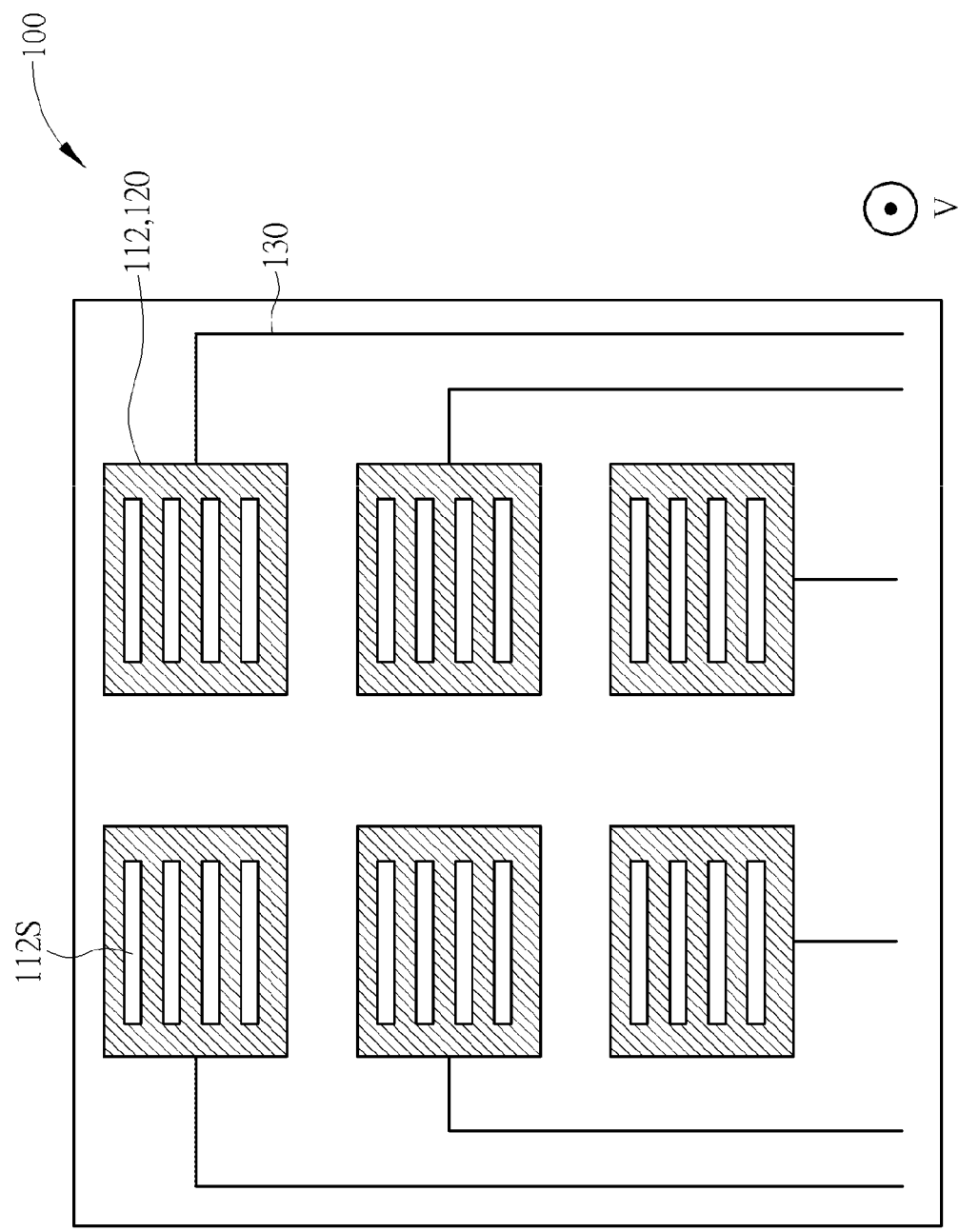
FIG. 2 is a schematic diagram of a first touch device according to the first embodiment of the present invention.
Figure 3:
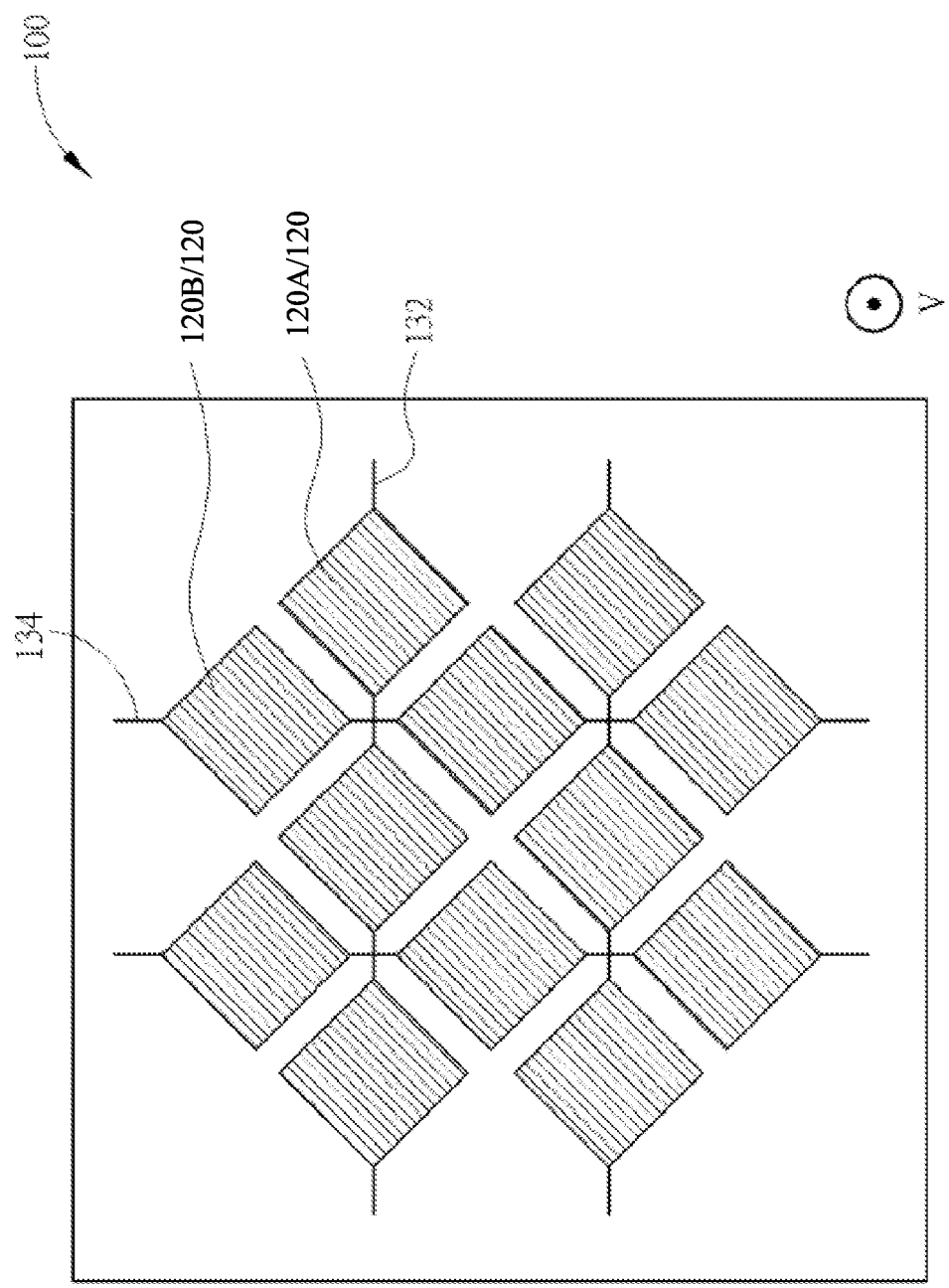
FIG. 3 is a schematic diagram of the first touch device according to a variant embodiment of the first embodiment of the present invention.

Referring to FIG. 2 and FIG. 3 together with FIG. 1, FIG. 2 is a schematic diagram of a first touch device according to the first embodiment of the present invention, and FIG. 3 is a schematic diagram of the first touch device according to a variant embodiment of the first embodiment of the present invention. As shown in FIG. 1 and FIG. 2, in the display panel 10 of this embodiment, in addition to being used as common electrodes, the first electrodes 112 may be also used as touch sensing pads 120 of the first touch device 100. In other words, the first touch device 100 and the display panel 10 are integrated to form a touch display panel. Besides, the touch display panel of this embodiment is an in-cell (In-cell) touch display panel, that is, the first touch device 100 is integrated in the display panel 10. Besides, the first touch device 100 of this embodiment is a self-capacitance touch device, and each touch sensing pad 120 can receive a signal from a processor, and can output a detection result (for example, the capacitance between a finger and a touch sensing pad 120), in a form of a signal, to the processor, so as to determine a touch position. The first touch device 100 may further include first connection wires 130 used to electrically connect the touch sensing pads 120 to the processor respectively. The touch sensing pads 120 and the first connection wires 130 may be formed by a same transparent conductive layer, but the present invention is not limited thereto. In another embodiment, alternatively, the first connection wires may be formed by a conductive layer other than the conductive layer forming the touch sensing pads 120. Besides, each touch sensing pad 120 of this embodiment may correspond to one or more pixels depending on requirements. In this embodiment, the touch sensing pads 120 may be rectangular electrodes with slits 112S, but the present invention is not limited thereto. In another variant embodiment, the second electrodes 114 may be used as the touch sensing pads 120, that is, when the first electrodes 112 are used as pixel electrodes, the second electrodes 114 may be used as common electrodes as well as the touch sensing pads 120 of the first touch device 100. At this time, the touch sensing pads 120 may be rectangular electrodes without slits, for example.

Further, as shown in FIG. 3, in a variant embodiment, a first touch device 100 may be a mutual capacitance touch device. The first touch device 100 may include first sensing pads 120A, second sensing pads 120B, second connection wires 132 and third connection wires 134. Touch sensing pads 120 may include the first touch sensing pads 120A and the second touch sensing pads 120B. The first touch sensing pads 120A may be electrically connected to each other along a direction by using the second connection wires 132, so as to form an array. The second touch sensing pads 120B may be electrically connected to each other along another direction by using the third connection wires 134, so as to form another array. Moreover, the array formed by the first touch sensing pads 120A may intersect and be insulated from the array formed by the second touch sensing pads 120B at the second connection wires 132 and the third connection wires 134. In this variant embodiment, the second connection wires 132 and the third connection wires 134 may be respectively formed by different conductive layers, for example, the second connection wires 132 are formed by a transparent conductive layer the same as that forming the first touch sensing pads 120A and the second touch sensing pads 120B, the third connection wires 134 may be formed by another conductive layer, and the second connection wires 132 may be electrically insulated from the third connection wires 134. In another variant embodiment, the second electrodes 114 may be respectively used as first touch sensing pads 120A and second touch sensing pads 120B. That is, when the first electrodes 112 are used as pixel electrodes, the second electrodes 114 may be used as common electrodes as well as the first touch sensing pads 120A and the second touch sensing pads 120B of the first touch device 100. At this time, each of the first touch sensing pads 120A and each of the second touch sensing pads 120B may respectively correspond to one or more pixels depending on requirements, and the first touch sensing pads 120A and the second touch sensing pads 120B may be rectangular electrodes without slits. In another variant embodiment, alternatively, the first touch sensing pads 120A and the second touch sensing pads 120B may be formed by different conductive layers.

Figure 4:
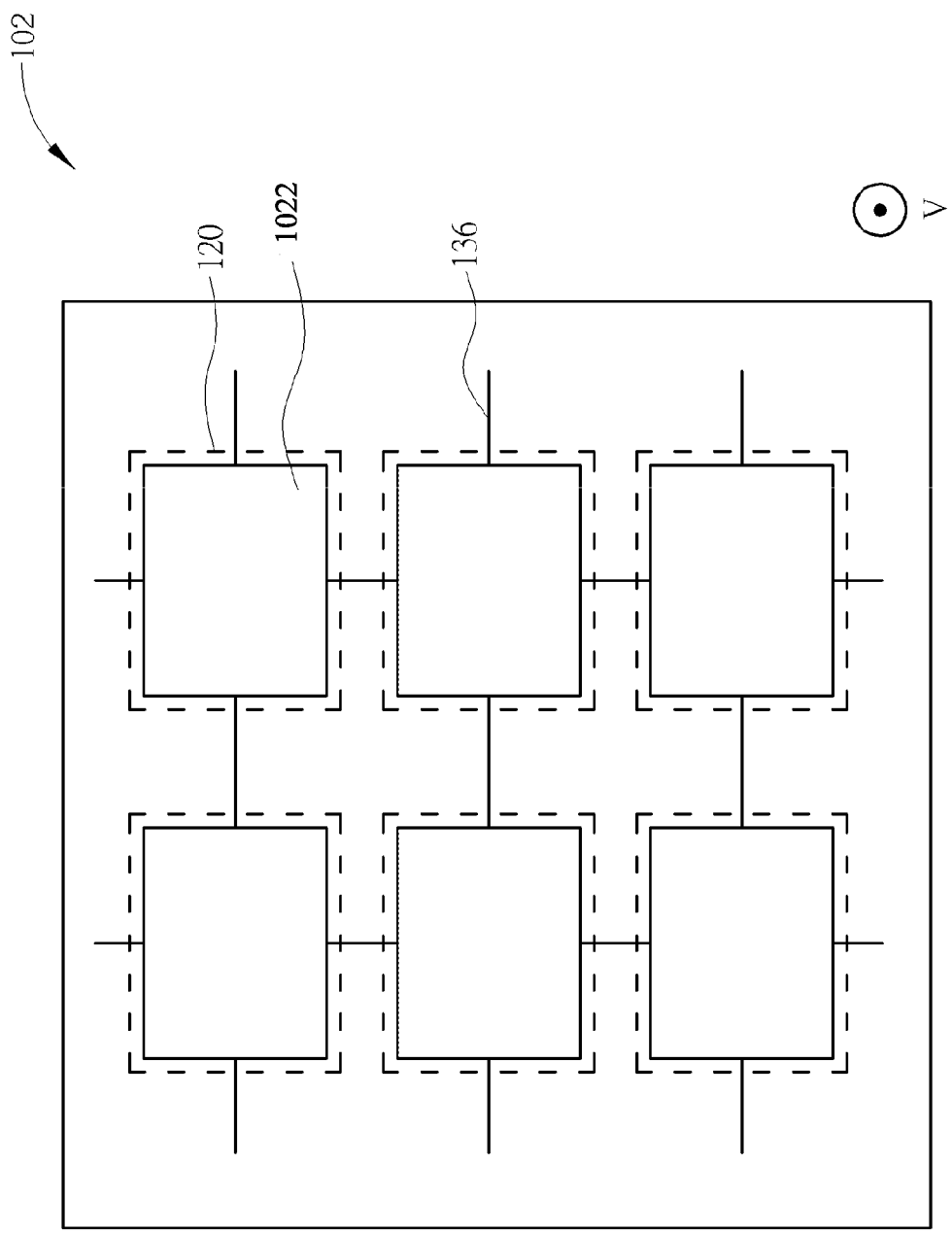
FIG. 4 is a schematic diagram of a conductive layer according to the first embodiment of the present invention.
Figure 5:
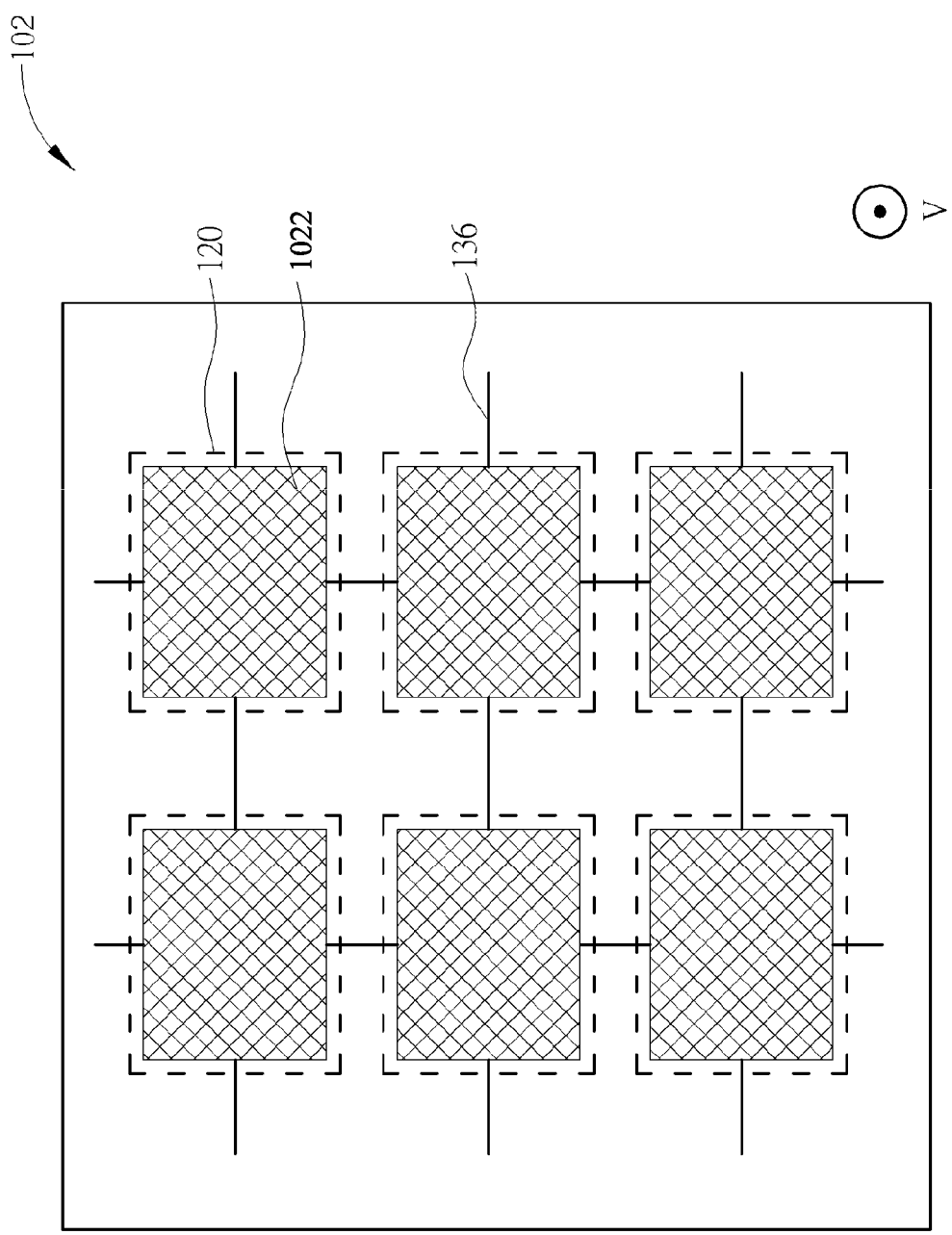
FIG. 5 is a schematic diagram of the conductive layer according to a variant embodiment of the first embodiment of the present invention.
Figure 6:
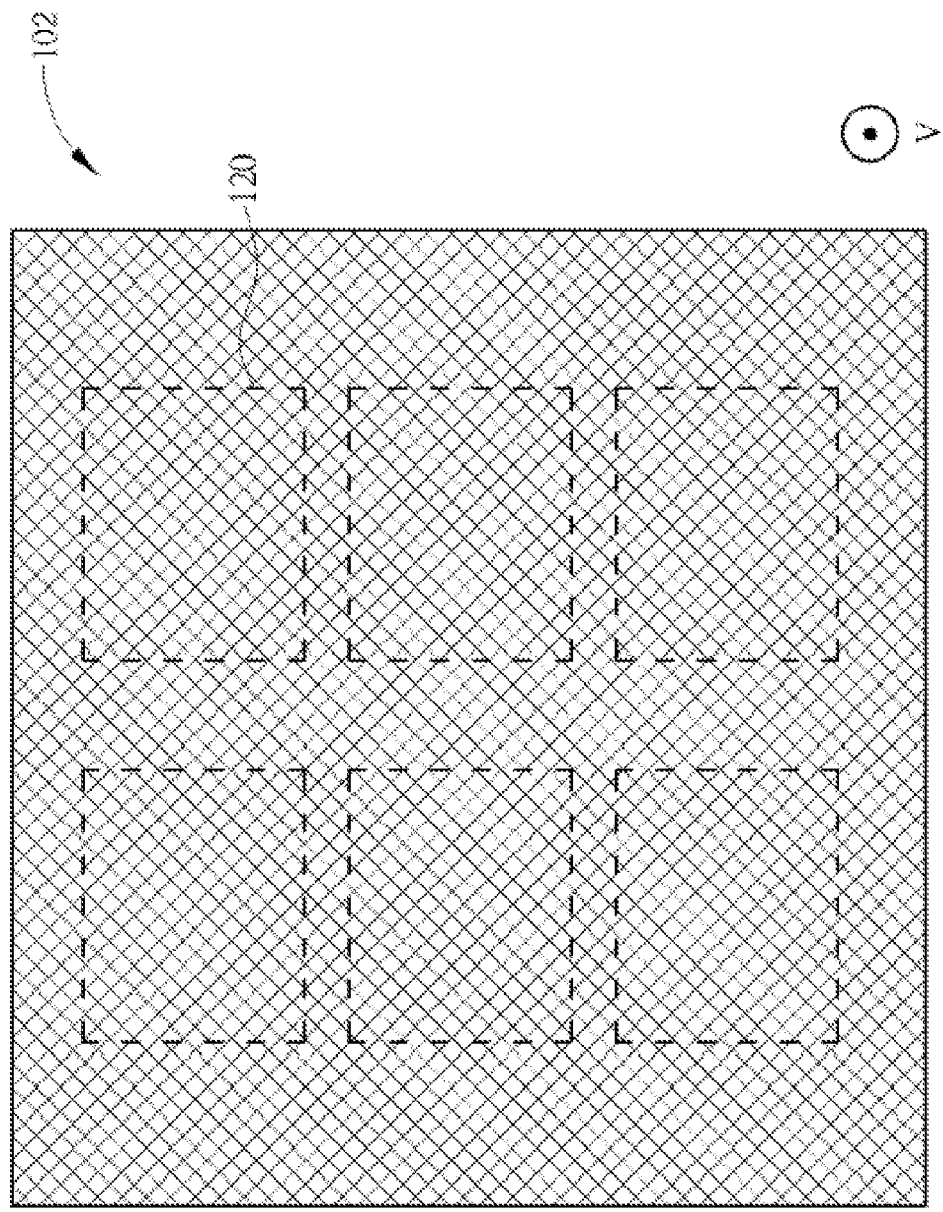
FIG. 6 is a schematic diagram of the conductive layer according to another variant embodiment of the first embodiment of the present invention.

Referring to FIG. 4 to FIG. 6 together with FIG. 1, FIG. 4 is a schematic diagram of a conductive layer according to the first embodiment of the present invention, and each of FIG. 5 and FIG. 6 is a schematic diagram of the conductive layer according to a variant embodiment of the first embodiment of the present invention. As shown in FIG. 1 to FIG. 4, in this embodiment, the conductive layer 102 is disposed under the display panel 10, and a material of the conductive layer 102 is silver, but the present invention is not limited thereto. The material of the conductive layer 102 may be another type of metal. The conductive layer 102 includes force sensing pads 122 and fourth connection wires 136, and the force sensing pads 122 may be electrically connected to each other by using the fourth connection wires 136. For example, each of the fourth connection wires 136 may connect any two adjacent force sensing pads 122, so as to enable the conductive layer 102 to form mesh-shaped patterns, but the present invention is not limited thereto. When a touch sensing pad 120 receives a signal, and the conductive layer 102 provides a voltage, for example, a common voltage, or is grounded, capacitance may be formed between the touch sensing pad 120 and the conductive layer 102. Besides, when a finger presses the display apparatus with touch sensing and force sensing functions 1A, a distance between a touch sensing pad 120 and the conductive layer 102 changes. Therefore, the capacitance between the touch sensing pad 120 and the conductive layer 102 also changes. As a result, a signal received by the processor from the first touch device 100 changes, and the processor can determine a pressing force on the basis thereof. The shapes of the force sensing pads 1022 of the present embodiment may be the same as the shapes of the touch sensing pads 120 (for example, rectangle shapes), and the touch sensing pads 120 respectively overlap the force sensing pads 1022 in a vertical projection direction V. When pressing, capacitance is also formed between the finger and a force sensing pad 1022. Therefore, a size of each force sensing pad 1022 of this embodiment may be designed to be less than a size of each touch sensing pad 120, so that the force sensing pad 1022 is less sensitive to the finger, and an error of determining a pressing force may be avoided. In another variant embodiment, a size of each force sensing pad 1022 may be designed to be greater than a size of each touch sensing pad 120. Therefore, in a process of manufacturing the display apparatus with touch sensing and force sensing functions 1A, alignment becomes easier. As shown in FIG. 5, in a variant embodiment, each force sensing pad 1022 may have a mesh structure. Further, as shown in FIG. 6, in another variant embodiment, the conductive layer 102 may have a mesh structure overlapping the entire surface of the touch sensing pads 120. Further, in another variant embodiment, the conductive layer 102 may be a solid metal (for example, silver) or another conductive material overlapping the entire surface of the touch sensing pads 120.

Continue referring to FIG. 1, as shown in FIG. 1, the elastic dielectric layer 104 of this embodiment may be disposed between the conductive layer 102 and the first touch device 100 and covers the conductive layer 102, and the touch sensing pads 120, the elastic dielectric layer 104 and the force sensing pads 1022 form the force sensing device. The elastic dielectric layer 104 includes an optical clear adhesive (Optical Clear Adhesive, OCA) or a UV glue (UV glue), and has a thickness less than or equal to 1000 micrometers. When a finger performs pressing, a distance between the conductive layer 102 and the first touch device 100 is reduced. In other words, the elastic dielectric layer 104 is compressed. After the pressing is finished, the elastic dielectric layer 104 may quickly rebound to the original state. Therefore, the distance between the conductive layer 102 and the first touch device 100 may quickly rebound to the original state by using the elastic dielectric layer 104, so as to avoid an error of a force sensing result that is caused by slow rebound of the distance between the conductive layer 102 and the first touch device 100. Besides, the force sensing device may further include a flexible board 122, and the conductive layer 102 is disposed between the elastic dielectric layer 104 and the flexible board 122. The flexible board 122 may be a polyethylene terephthalate (polyethylene terephthalate, PET) flexible board or another appropriate flexible board, but the present invention is not limited thereto. The flexible board 122 may be used as a support for the conductive layer 102. A method for forming the conductive layer 102 may include first providing a flexible board 122, then forming the conductive layer 102 on the flexible board 122, and then performing other subsequent processes, but the present invention is not limited thereto.

Continue referring to FIG. 1, as shown in FIG. 1, the backlight module 20 is disposed under the display panel 10. The backlight module 20 is disposed between the conductive layer 102 and the display panel 10. The backlight module 20 includes a light guide plate 124 and at least one optical sheet 126. The optical sheet 126 is disposed between the light guide plate 124 and the display panel 10, and the light guide plate 124 and the optical sheet 126 are disposed between the display panel 10 and the conductive layer 102. A material of the light guide plate 124 may be a light guide material with a good light transmission effect, and the optical sheet 126 may include a diffuser or an optical film with another application. The backlight module 20 may further include a light source, and a light emitting element thereof may be a cold cathode fluorescent lamp (CCFL), an external electrode fluorescent lamp (EEFL), a light emitting diode (LED), or another type of light emitting element. The backlight module 20 may be an edge-type backlight module or a direct-type backlight module. When metal is selected as the material of the conductive layer 102 of the present embodiment, the conductive layer 102 may also be used as a reflective sheet of the backlight module 20. In other words, the conductive layer 102, the elastic dielectric layer 104 and the flexible board 122 of this embodiment are integrated with the backlight module 20, and may form a part of the backlight module 20, but the present invention is not limited thereto. As compared with a traditional display apparatus, the display apparatus with touch sensing and force sensing functions 1A of this embodiment disposes an elastic dielectric layer between the conductive layer 102 and the first touch device 100, so as to enable a distance between the conductive layer 102 and the first touch device 100 to be quickly rebounded to an original state after pressing is finished, thereby avoiding an error of a force sensing result that is caused by excessive slow rebounding of the distance between the conductive layer 102 and the first touch device 100. Besides, the display apparatus with touch sensing and force sensing functions 1A of this embodiment may further include an outer frame 128, and the display panel 10, the backlight module 20, the conductive layer 102, the elastic dielectric layer 104 and the flexible board 122 may be disposed in the outer frame 128. A material of the outer frame 128 may include metal, so as to prevent electronic elements disposed in the outer frame 128 from being interfered by electronic elements outside the outer frame 128, but the present invention is not limited thereto.

Figure 7:
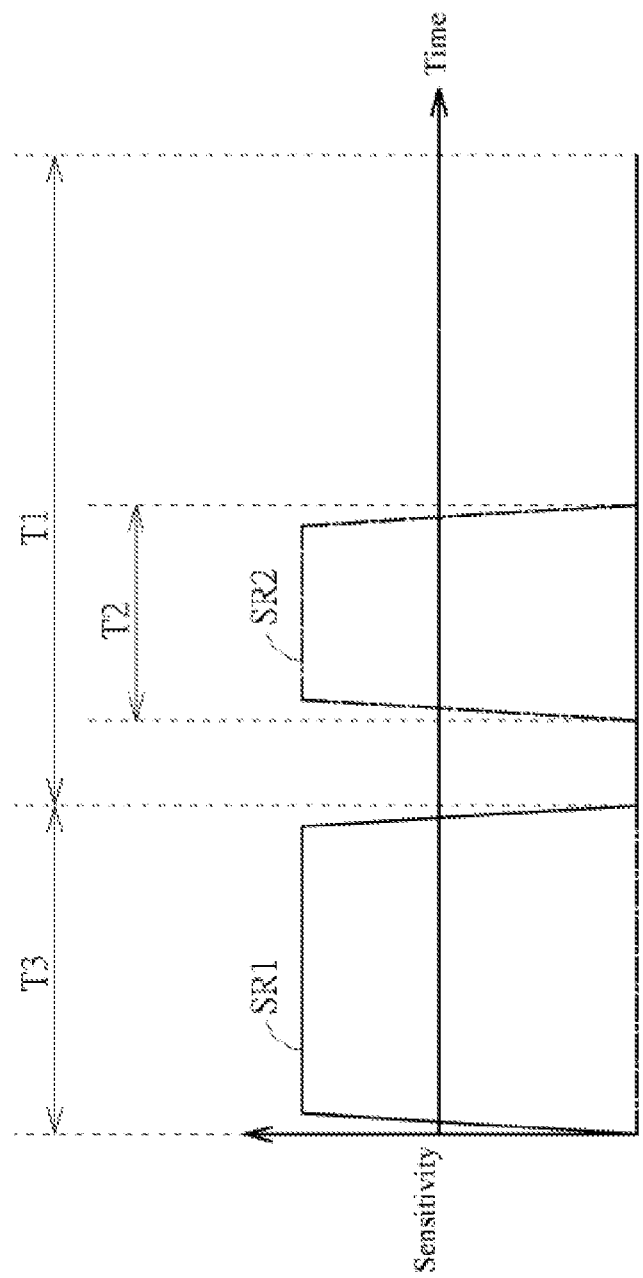
FIG. 7 is a timing diagram showing sensitivities of the touch sensing device corresponding to a finger and the conductive layer according to the first embodiment of the present invention.
Figure 8:
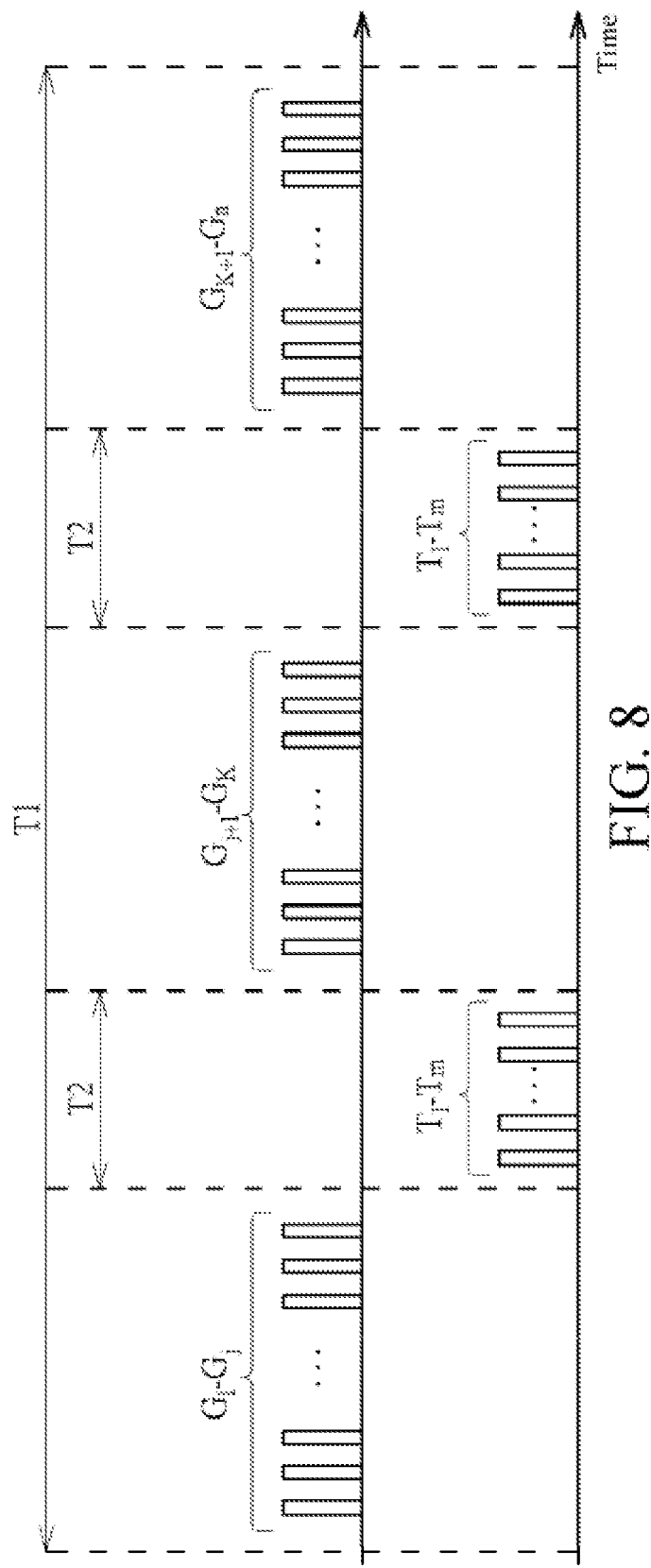
FIG. 8 is a schematic diagram showing a display period and a touch detection period according to the first embodiment of the present invention.

The following further describes a method for driving the display apparatus with touch sensing and force sensing functions of the first embodiment in detail. Referring to FIG. 7 and FIG. 8, FIG. 7 is a timing diagram of sensitivities of the touch sensing device corresponding to a finger and the conductive layer according to the first embodiment of the present invention, and FIG. 8 is a schematic diagram showing a frame display period and a touch detection period according to the first embodiment of the present invention. As shown in FIG. 7 and FIG. 8, in the method for driving the display apparatus with touch sensing and force sensing functions 1A of this embodiment, when the display apparatus with touch sensing and force sensing functions 1A operates, a frame display period T1, a touch detection period T2, and a force detection period T3 are included. The frame display period T1 may not overlap the force detection period T3, so as to prevent the frame display from being affected. For example, the force detection period T3 may fall between two subsequent frame display periods T1. In the driving method of this embodiment, a common signal is provided to the conductive layer 102 in the force detection period T3, and a force sensing signal corresponding to a pressing force is detected via the first touch device 100. At this time, because the common signal is input to the conductive layer 102, the force sensing signal transmitted to the touch sensing pads 120 of the first touch device 100 is affected by the common signal of the conductive layer 102 and therefore changes. As compared with a state that the conductive layer 102 is in a floating state, the sensitivity SR1 of the first touch device 100 to a change of the pressing force when the common signal is provided to the conductive layer 102 is relatively high. Specifically, the common signal input to the conductive layer 102 may be a low voltage signal or a ground voltage signal, for example. At the same time, a drive signal may be provided to the first touch device 100, and capacitive coupling is generated between the first touch device 100 and the conductive layer 102. Therefore, the processor may receive a sensing signal by using the first touch device 100. Moreover, when the capacitance between the first touch device 100 and the conductive layer 102 changes, the sensing signal changes, that is, the force sensing signal, so that the processor may further determine a pressing force.

On the other hand, alternatively, the first electrodes 112 may be used as the touch sensing pads 120 used to detect a touch. To prevent force sensing and touch sensing from affecting each other, in an example, the touch detection period T2 may not overlap the force detection period T3. In the driving method of this embodiment, the touch detection period T2 falls within the frame display period T1. Specifically, in the frame display period T1, a display signal is provided to the display panel 10, so as to display a frame. In the touch detection period T2, providing a common signal to the conductive layer 102 is stopped, or the conductive layer 102 is electrically disconnected from a ground terminal, so as to enable the conductive layer 102 to be in a floating state. Besides, in the touch detection period T2, at least one touch drive signal is further transmitted to the first touch device 100, and at least one touch sensing signal (e.g., the capacitance between a finger and a touch sensing pad 120) is detected and output from the first touch device 100, so as to further determine a touch position. At this time, the conductive layer 102 is in the floating state, and therefore, the conductive layer 102 does not interfere with the signal transmitted on the touch sensing pads 120. Therefore, as compared with a state that the common signal is provided to the conductive layer 102, at this time, the sensitivity SR2 of the first touch device 100 to a finger is relatively high. Specifically, the step of providing a display signal includes sequentially providing scanning signals G1 to Gn to corresponding scanning lines; the step of transmitting at least one touch drive signal includes transmitting touch drive signals T1 to Tm to corresponding touch sensing pads 120; the first touch device 100 and the common electrodes of the display panel 10 of this embodiment are the first electrodes 112, and therefore, an interval for transmitting the touch drive signals T1 to Tm does not overlap an interval for providing the scanning signals G1 to Gn, so as to avoid a conflict between the touch drive signals T1 to Tm and the scanning signals G1 to Gn and further prevent the conflict from affecting the display of a frame. M and n may be positive integers respectively, and are determined according to actual requirements. The frame display period T1 may include at least one touch detection period T2. For example, the frame display period T1 may include two touch detection periods T2. For example, scanning signals G1 to Gj are sequentially provided to first to $j^{th}$ scanning lines; then in one touch detection period T2, touch drive signals T1 to Tm may be respectively provided to first to $m^{th}$ touch sensing pads 120; then scanning signals Gj+1 to Gk are sequentially provided to (j+1)th to $k^{th}$ scanning lines; then in another touch detection period T2, touch drive signals T1 to Tm may be respectively provided to the first to the $m^{th}$ touch sensing pads 120 respectively again; and then scanning signals Gk+1 to Gn are sequentially provided to (k+1)th to $n^{th}$ scanning lines, so as to display a frame and detect a touch position in one frame display period T1. Moreover, the foregoing manner for providing signals may be implemented in a continuous and repeated manner. J and k may be positive integers, j is less than k, and k is less than n. J and k may be determined according to actual requirements. However, the method for transmitting the touch drive signals T1 to Tm to the corresponding touch sensing pads 120 is not limited to the foregoing example. In another variant embodiment, the frame display period T1 may include only one touch detection period T2. That is, only m touch drive signals T1 to Tm are defined into different parts that are respectively provided to corresponding touch sensing pads 120 in corresponding periods, so long as the m touch drive signals T1 to Tm corresponding to a single frame are provided to the corresponding touch sensing pads 120 in one frame display period T1. The foregoing actions of providing signals or receiving signals, and further obtaining a result may be executed by a processor (processor), but the present invention is not limited thereto.

The following describes a method for calculating, by the display apparatus with touch sensing and force sensing functions 1A, a force sensing capacitance difference $\Delta Cf$ used to determine a force. In a touch detection period T2, the conductive layer 102 is in a floating state, and at this time, the first touch device 100 detects a capacitance difference $\Delta Ct1$ between the first touch device 100 and a finger. In a force detection period T3, the conductive layer 102 receives a ground voltage signal, for example, and at this time, the first touch device 100 detects a capacitance difference $\Delta Ct2$ between the first touch device 100 and a finger, and a capacitance difference $\Delta Cf$ between the first touch device 100 and the conductive layer 102. The capacitance between the first touch device 100 and the finger when the conductive layer 102 is in the floating state is nearly the same as that when the conductive layer 102 receives a ground voltage signal, and therefore, the capacitance difference $\Delta Ct1$ may be regarded as equal to the capacitance difference $\Delta Ct2$. Therefore, the capacitance difference $\Delta Cf$ between the first touch device 100 and the conductive layer 102 may be obtained by subtracting the capacitance difference detected by the first touch device 100 in the touch detection period T2 from the capacitance difference detected by the first touch device 100 in the force detection period T3, and a pressing force may further be determined.

The display apparatus with touch sensing and force sensing functions of the present invention is not limited to the foregoing embodiments. The following sequentially introduces display apparatuses with touch sensing and force sensing functions of other embodiments and variant embodiments of the present invention. For ease of comparing the differences of the embodiments and the variant embodiments and simplifying the description, a same reference sign is used to mark a same element in the following embodiments and variant embodiments. Description is mainly made to the differences between the embodiments and the variant embodiments, and details about the repeated parts are not described again.

Figure 9:
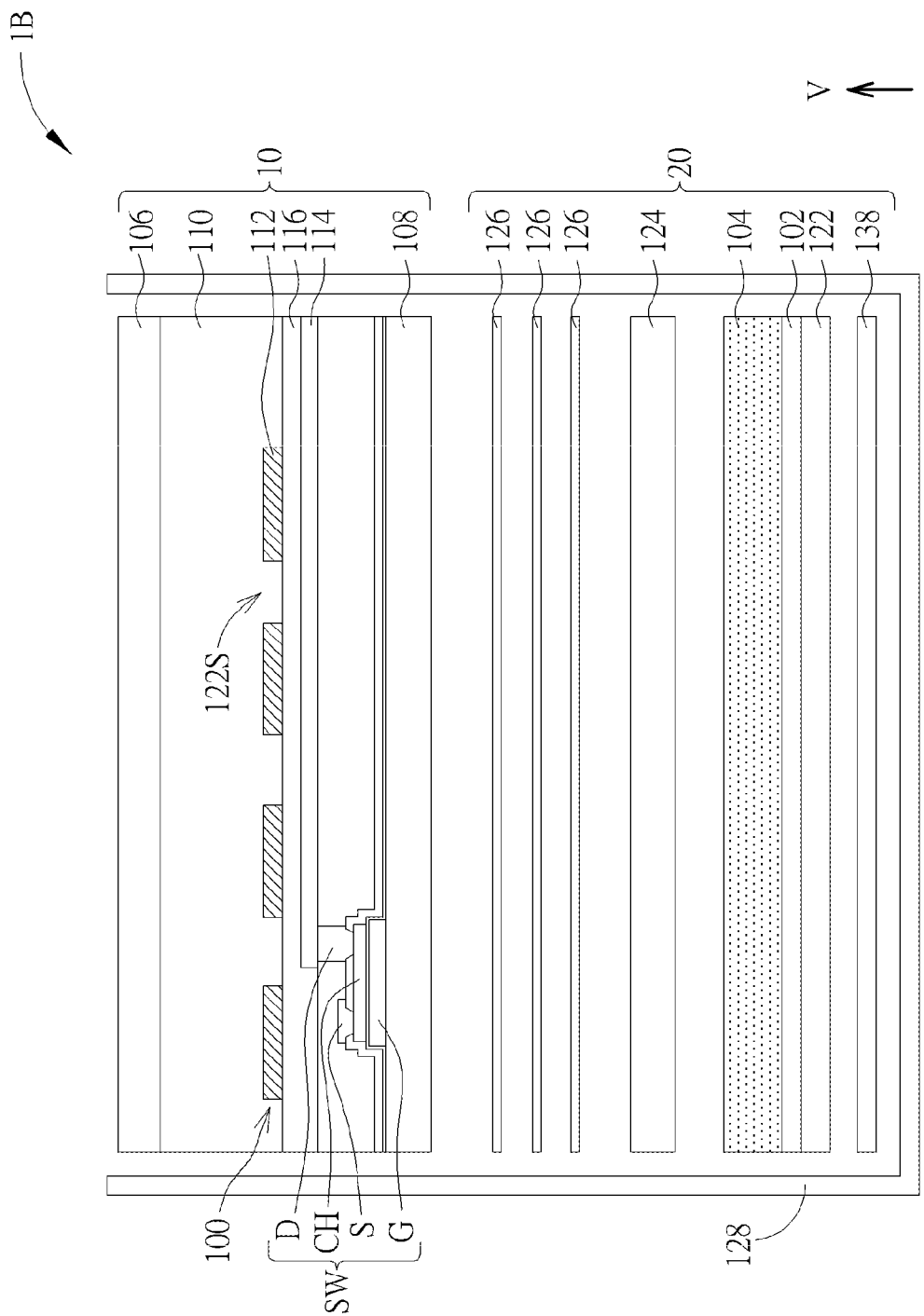
FIG. 9 is a schematic diagram of the display apparatus with touch sensing and force sensing functions according to a first variant embodiment of the first embodiment of the present invention.

Referring to FIG. 9, FIG. 9 is a schematic diagram of the display apparatus with touch sensing and force sensing functions according to a first variant embodiment of the first embodiment of the present invention. As shown in FIG. 9, the display apparatus with touch sensing and force sensing functions 1B of this variant embodiment differs from the first embodiment in that the conductive layer 102 includes a transparent conductive material such as ITO, but the present embodiment is not limited thereto. The backlight module 20 further includes a reflective sheet 138, and the conductive layer 102, the elastic dielectric layer 104 and the flexible board 122 are disposed between the light guide plate 124 and the reflective sheet 138. In other words, the conductive layer 102, the elastic dielectric layer 104 and the flexible board 122 of this variant embodiment may be regarded as a part of the backlight module 20. A material of the reflective sheet 138 may select a material with a reflective property, such as metal, but the present embodiment is not limited thereto.

Figure 10:
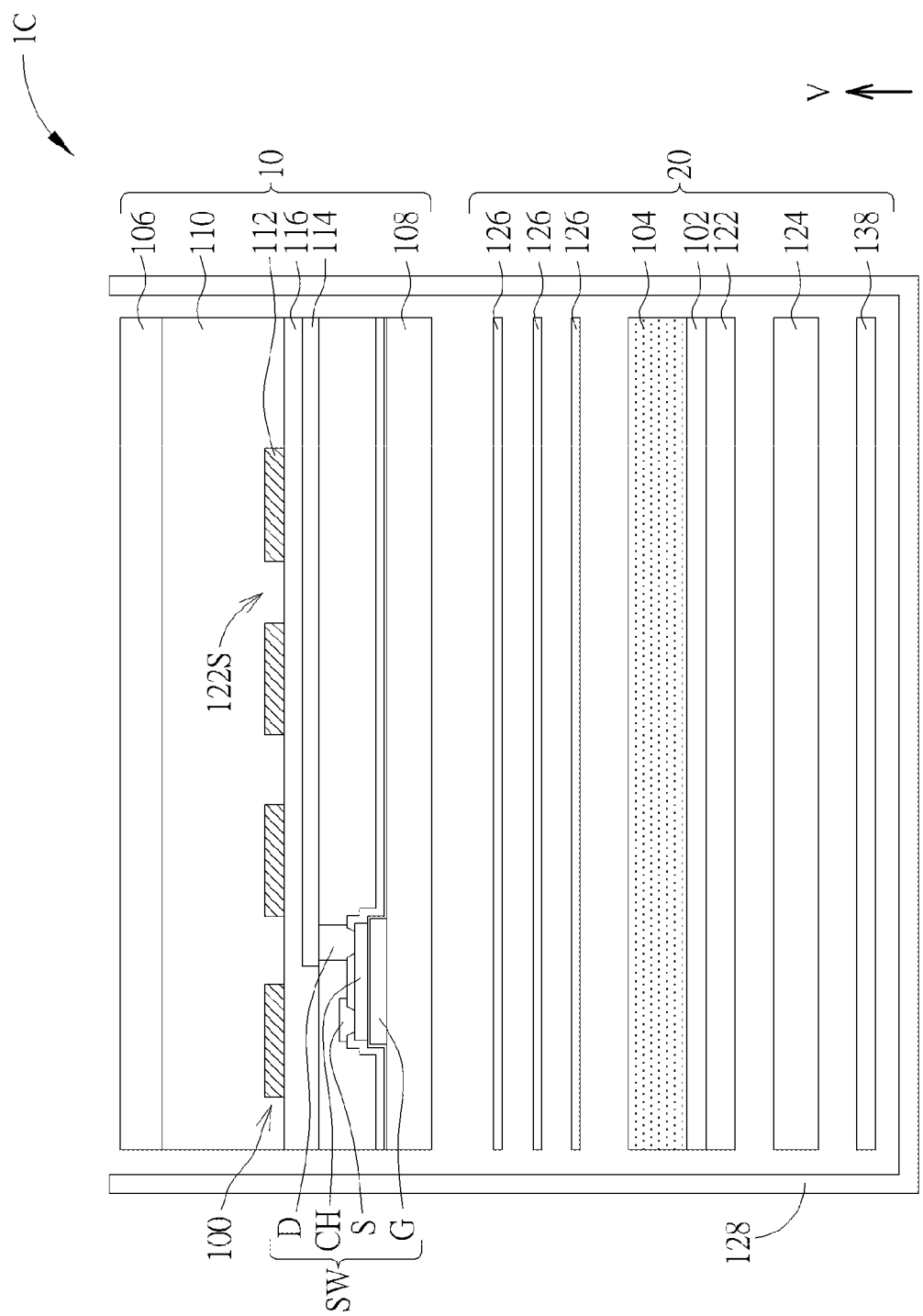
FIG. 10 is a schematic diagram of the display apparatus with touch sensing and force sensing functions according to a second variant embodiment of the first embodiment of the present invention.

Referring to FIG. 10, FIG. 10 is a schematic diagram of the display apparatus with touch sensing and force sensing functions according to a second variant embodiment of the first embodiment of the present invention. As shown in FIG. 10, the display apparatus with touch sensing and force sensing functions 1C of this variant embodiment differs from the first embodiment in that the conductive layer 102 includes a transparent conductive material such as ITO, but the present embodiment is not limited thereto. The backlight module 20 further includes a reflective sheet 138. The conductive layer 102, the elastic dielectric layer 104 and the flexible board 122 are disposed between the light guide plate 124 and the optical sheet 126, and the light guide plate 124 is disposed between the optical sheet 126 and the reflective sheet 138. A material of the reflective sheet 138 may select a material with a reflective property, such as metal, but the present embodiment is not limited thereto. In other words, the conductive layer 102, the elastic dielectric layer 104 and the flexible board 122 of this variant embodiment may be regarded as a part of the backlight module 20. As compared with the first embodiment, a distance between the conductive layer 102 and the first touch device 100 of this variant embodiment is relatively short, and therefore, it would be easier to detect a change of a force.

Figure 11:
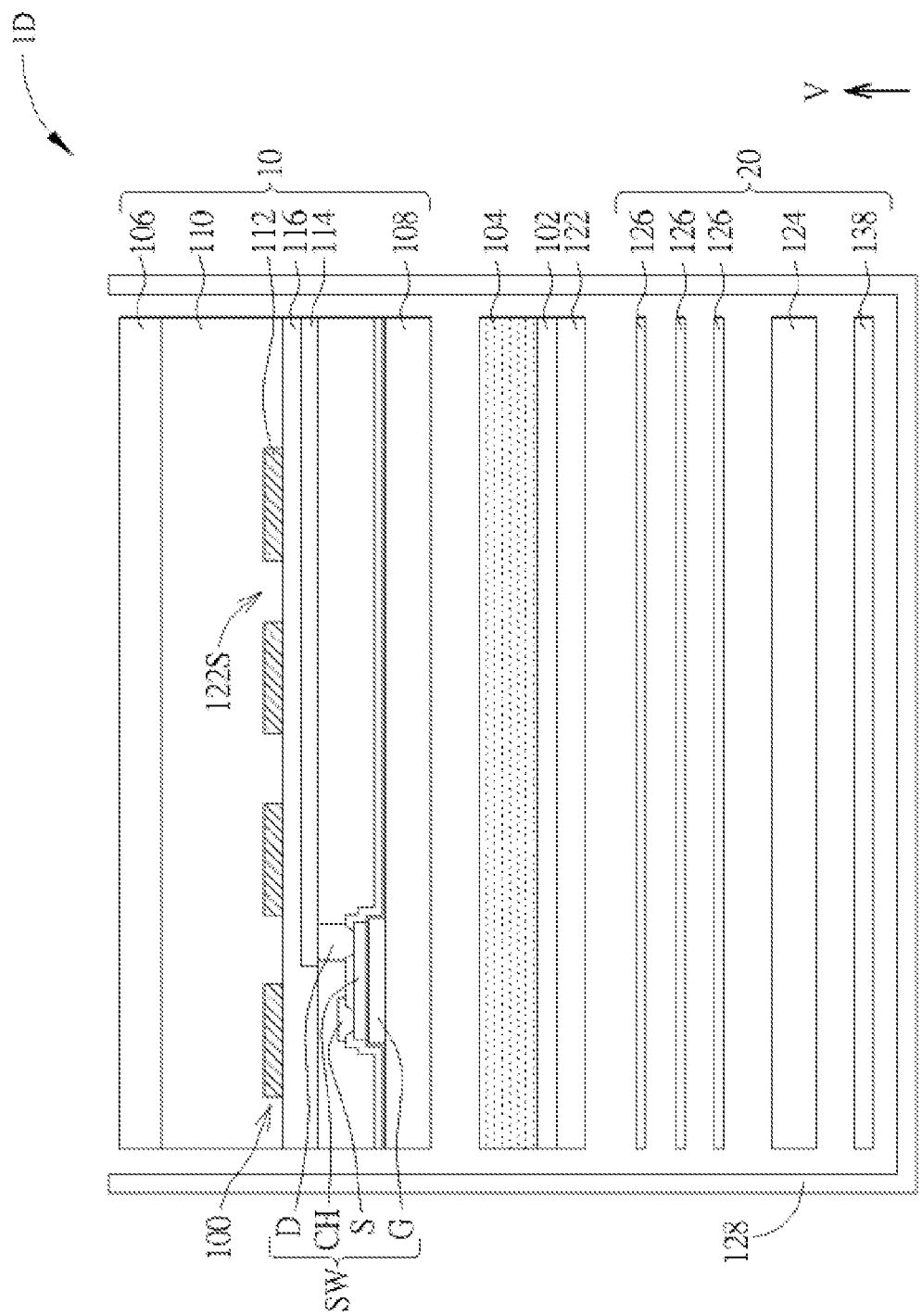
FIG. 11 is a schematic diagram of the display apparatus with touch sensing and force sensing functions according to a third variant embodiment of the first embodiment of the present invention.

Referring to FIG. 11, FIG. 11 is a schematic diagram of the display apparatus with touch sensing and force sensing functions according to a third variant embodiment of the first embodiment of the present invention. As shown in FIG. 11, the display apparatus with touch sensing and force sensing functions 1D of this variant embodiment differs from the first embodiment in that the conductive layer 102 is located between the backlight module 20 and the display panel 10, and the conductive layer 102 includes a transparent conductive material such as ITO, but the present embodiment is not limited thereto. The backlight module 20 includes the reflective sheet 138, the light guide plate 124 and the optical sheet 126. The light guide plate 124 is disposed between the optical sheet 126 and the reflective sheet 138, and the conductive layer 102, the elastic dielectric layer 104 and the flexible board 122 are disposed between the second substrate 108 and the optical sheet 126. A material of the reflective sheet 138 may select a material with a reflective property, such as metal, but the present embodiment is not limited thereto. As compared with the first embodiment, a distance between the conductive layer 102 and the first touch device 100 of this variant embodiment is relatively short, and therefore, it would be easier to detect a change of a force.

Figure 12:
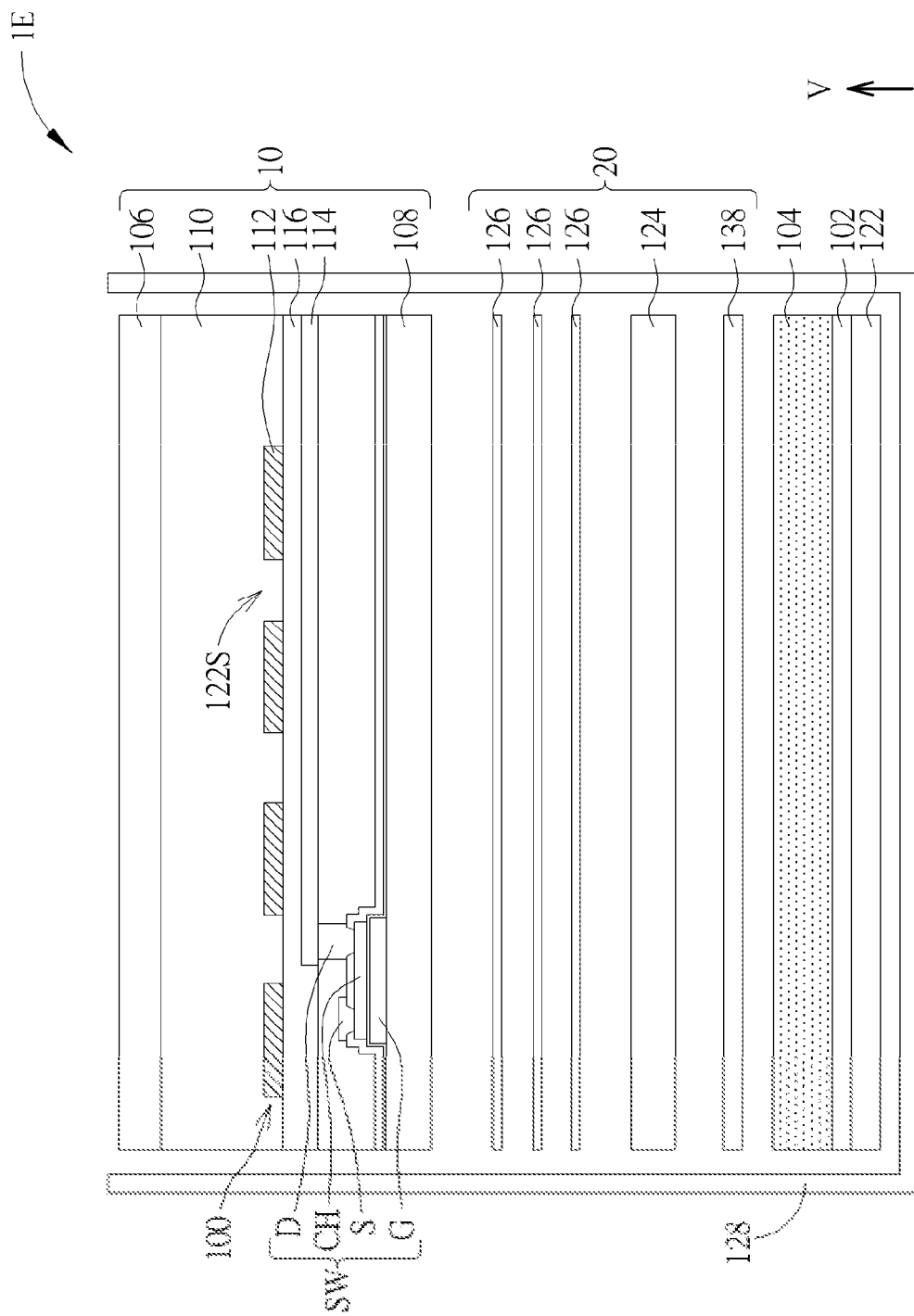
FIG. 12 is a schematic diagram of the display apparatus with touch sensing and force sensing functions according to a fourth variant embodiment of the first embodiment of the present invention.

Referring to FIG. 12, FIG. 12 is a schematic diagram of the display apparatus with touch sensing and force sensing functions according to a fourth variant embodiment of the first embodiment of the present invention. As shown in FIG. 12, the display apparatus with touch sensing and force sensing functions 1E of this variant embodiment differs from the first embodiment in that the backlight module 20 further includes a reflective sheet 138, and the reflective sheet 138 is disposed between the light guide plate 124 and the elastic dielectric layer 104. A material of the reflective sheet 138 may select a material with a reflective property, such as metal, but the present invention is not limited thereto. Besides, a material of the conductive layer 102 of this variant embodiment may be a transparent conductive material such as ITO, or may be metal, such as silver, but the present invention is not limited thereto.

Figure 13:
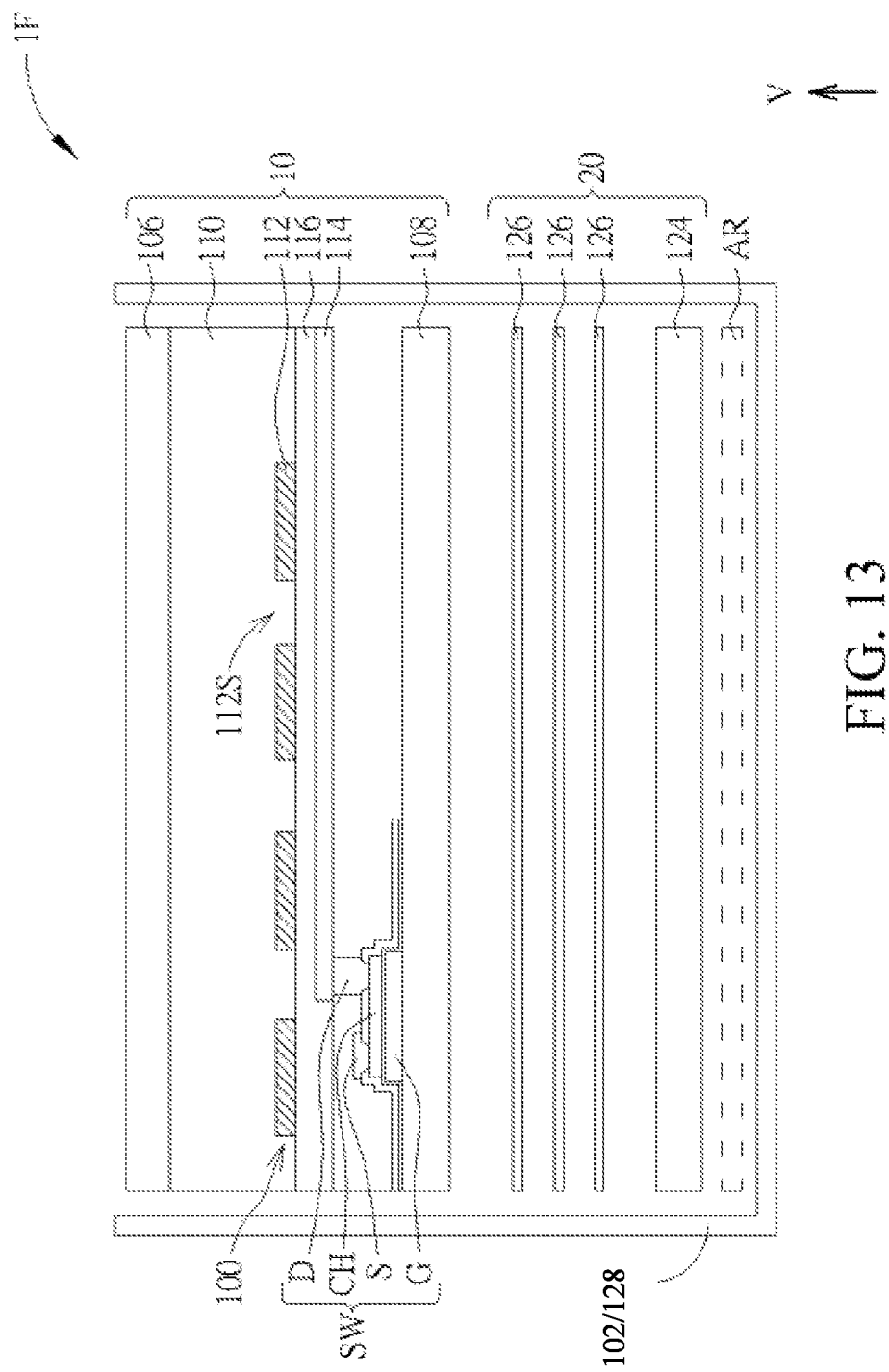
FIG. 13 is a schematic diagram of the display apparatus with touch sensing and force sensing functions according to a fifth variant embodiment of the first embodiment of the present invention.

Referring to FIG. 13, FIG. 13 is a schematic diagram of the display apparatus with touch sensing and force sensing functions according to a fifth variant embodiment of the first embodiment of the present invention. As shown in FIG. 13, the display apparatus with touch sensing and force sensing functions 1F of this variant embodiment differs from the first embodiment in that the conductive layer 102 is a part of the outer frame 128. In other words, in this variant embodiment, the outer frame 128 is directly used as the conductive layer 102. At this time, a material of the outer frame 128 may be metal. Besides, the outer frame 128 of this variant embodiment may be an outer frame of the backlight module 20, or may integrate with a middle frame of the display apparatus with touch sensing and force sensing functions 1F, but the present embodiment is not limited thereto. In addition, the display apparatus with touch sensing and force sensing functions 1F of this variant embodiment does not provide an elastic dielectric layer and a flexible board, but the present embodiment is not limited thereto. In this embodiment, along the vertical projection direction V, the outer frame 128, a gap AR and the touch sensing pads 120 form a force sensing device; the gap AR may be used as a dielectric layer of the force sensing device, the dielectric layer may be gas, for example, e.g., air or a film encapsulating gas, and a thickness of the gap AR is 50 µm to 1000 µm, for example. In another variant embodiment, an elastic dielectric layer may be disposed between the light guide plate 124 and the outer frame 128.

Figure 14:
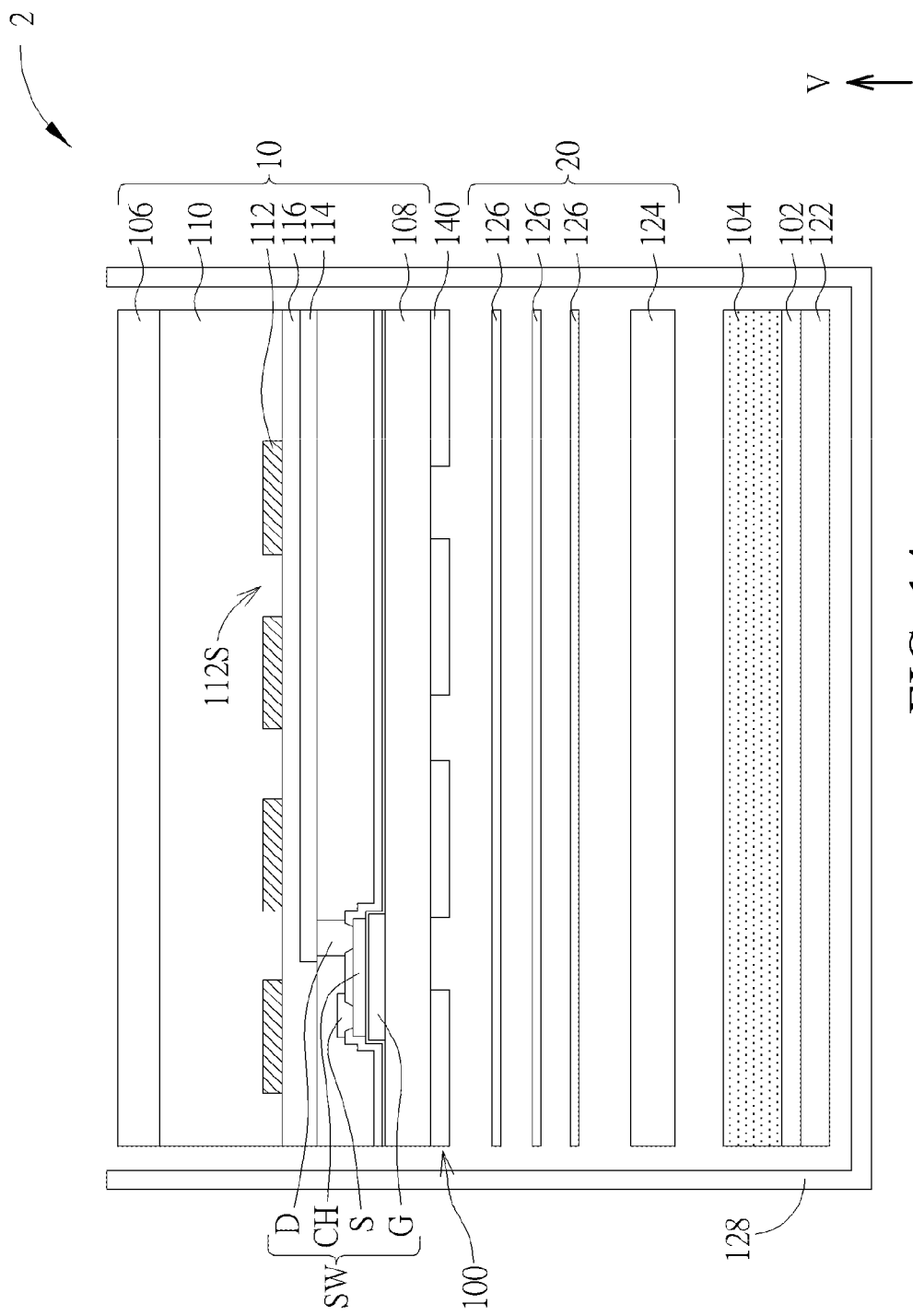
FIG. 14 is a schematic diagram of a display apparatus with touch sensing and force sensing functions according to a second embodiment of the present invention.
Figure 15:
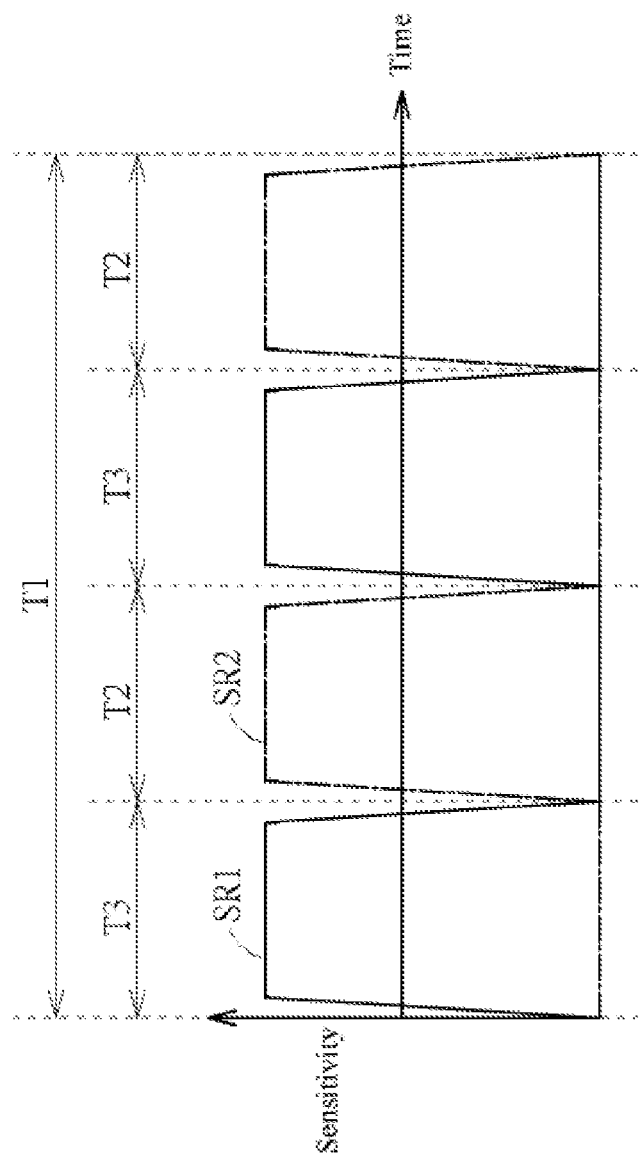
FIG. 15 is a timing diagram of sensitivities of a touch sensing device corresponding to a finger and a conductive layer according to the second embodiment of the present invention.

Referring to FIG. 14 and FIG. 15, FIG. 14 is a schematic diagram of a display apparatus with touch sensing and force sensing functions according to a second embodiment of the present invention, and FIG. 15 is a timing diagram of sensitivities of a touch sensing device to a finger and a conductive layer according to the second embodiment of the present invention. As shown in FIG. 14, this embodiment differs from the first embodiment in that a touch display panel is an on-cell (On-cell) touch display panel. For example, a display apparatus with touch sensing and force sensing functions 2 further includes another conductive layer 140, disposed between a second substrate 108 and an optical sheet 126; the conductive later 140 may be made of a transparent conductive material, such as ITO; and the conductive layer 140 is used as a first touch device 100. In other words, the first touch device 100 of this embodiment is located outside a display panel 10, for example, located on a surface, far away from a first substrate 106, of the second substrate 108. Therefore, as compared with the first embodiment, a distance between the conductive layer 102 and the first touch device 100 of this variant embodiment is relatively short, and therefore, it would be easier to detect a change of a force. On the other hand, the features of the foregoing variant embodiments of the first embodiment may be applied to this embodiment.

As shown in FIG. 15, this embodiment differs from the driving method of the first embodiment in that the first touch device 100 and pixel electrodes or common electrodes of the display panel 10 that participate in force detection and touch position detection are different conductive layers. Therefore, signals received and transmitted by the first touch device 100 do not conflict with signals received and transmitted by the pixel electrodes or the common electrodes of the display panel 10. Therefore, a frame display period T1 can overlap a force detection period T3 and a touch detection period T2, that is, displaying a frame may be performed at an interval the same as an interval for detecting a force or a touch position. In another variant embodiment, the frame display period T1 may overlap one of the force detection period T3 and the touch detection period T2. In addition, it is worth noting that, in the driving method of this embodiment, a common signal is provided to the conductive layer 102 in the force detection period T3, and a force sensing signal corresponding to a pressing force is detected by using the first touch device 100. At this time, because the common signal is input to the conductive layer 102, the force sensing signal transmitted to touch sensing pads 120 of the first touch device 100 is affected by the common signal of the conductive layer 102 and therefore changes. As compared with a state that the conductive layer 102 is in a floating state, the sensitivity SR1 of the first touch device 100 to a change of the pressing force when the common signal is provided to the conductive layer 102 is relatively high. On the other hand, in the touch detection period T2, providing a common signal to the conductive layer 102 is stopped, or the conductive layer 102 is electrically disconnected from a ground terminal, so as to enable the conductive layer 102 to be in a floating state. At this time, the conductive layer 102 is in the floating state, and therefore, the conductive layer 102 does not interfere with the signal transmitted on the touch sensing pads 120. Therefore, as compared with a state that the common signal is provided to the conductive layer 102, at this time, the sensitivity SR2 of the first touch device 100 to a finger is relatively high.

Figure 16:
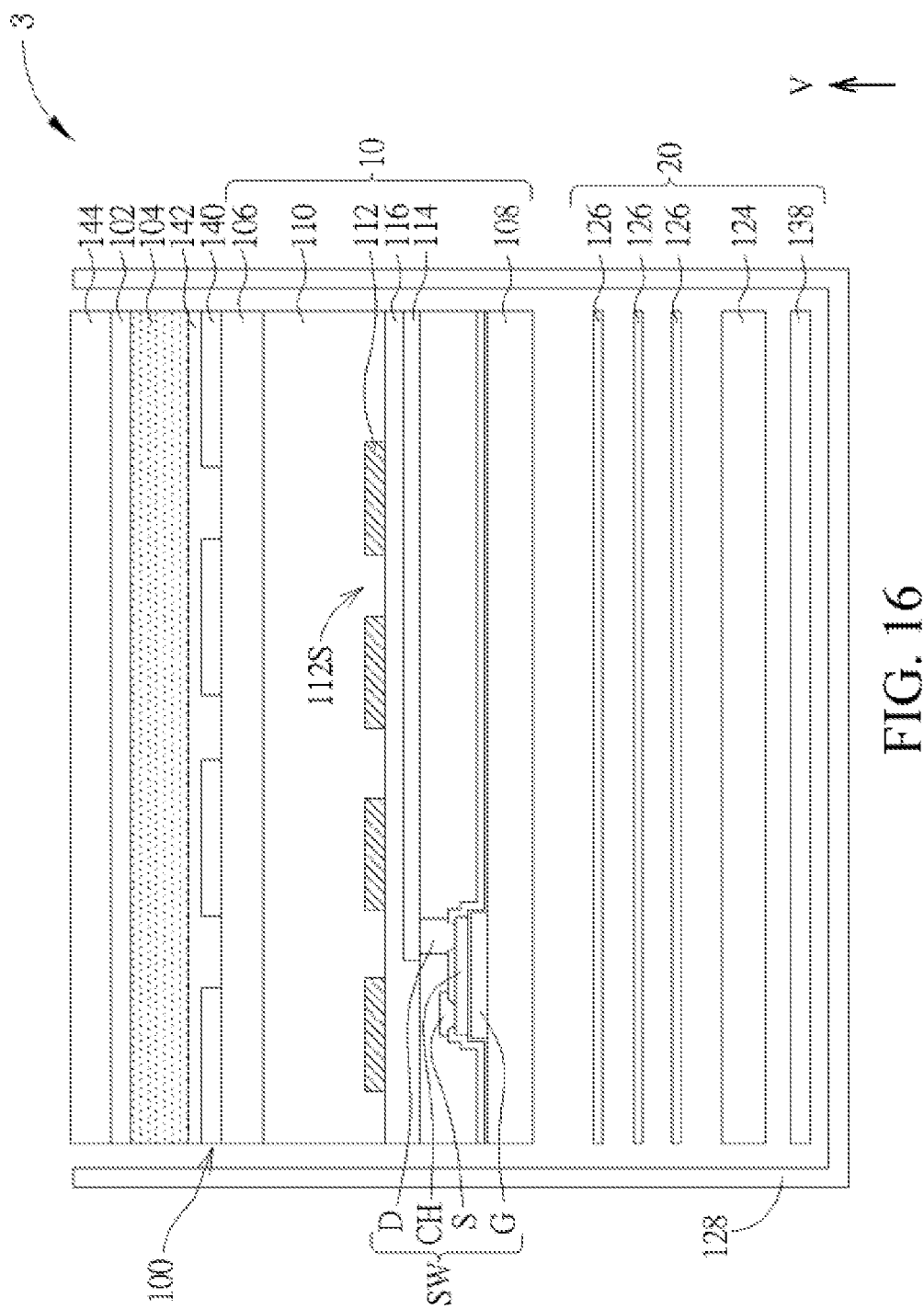
FIG. 16 is a schematic diagram of a display apparatus with touch sensing and force sensing functions according to a third embodiment of the present invention.

Referring to FIG. 16, FIG. 16 is a schematic diagram of a display apparatus with touch sensing and force sensing functions according to a third embodiment of the present invention. As shown in FIG. 16, this embodiment differs from the first embodiment in that a touch display panel is an on-cell (On-cell) touch display panel. For example, a display apparatus with touch sensing and force sensing functions 3 further includes another conductive layer 140, a first substrate 106 is disposed between a second substrate 108 and the conductive layer 140, and the conductive layer 140 is used as a first touch device 100. In other words, the first touch device 100 of this embodiment is located outside a display panel 10, for example, located on a surface, far away from the second substrate 108, of the first substrate 106. Besides, the display apparatus with touch sensing and force sensing functions 3 further includes a polarizer 142 and a cover 144, the polarizer 142 is disposed on the first substrate 106 and covers the conductive layer 140, and the conductive layer 140 is disposed between the cover 144 and the first substrate 106. The cover 144 may be a hard cover, such as cover glass (cover glass), or may be a flexible (flexible) cover, or may be a cover formed of another appropriate material. Besides, an elastic dielectric layer 104 of the display apparatus with touch sensing and force sensing functions 3 is disposed between the polarizer 142 and the cover 144, and a conductive layer 102 is disposed between the elastic dielectric layer 104 and the cover 144. The conductive layer 140 and the conductive layer 102 of this embodiment may be made of a transparent conductive material, such as ITO, but the present embodiment is not limited thereto. For example, in this embodiment, first, the conductive layer 102 is formed on the cover 144, and then the conductive layer 102 is stuck to the conductive layer 140 facing the first substrate 106 by using the elastic dielectric layer 104 (e.g., OCA), so as to form the foregoing structure of this embodiment.

Figure 17:
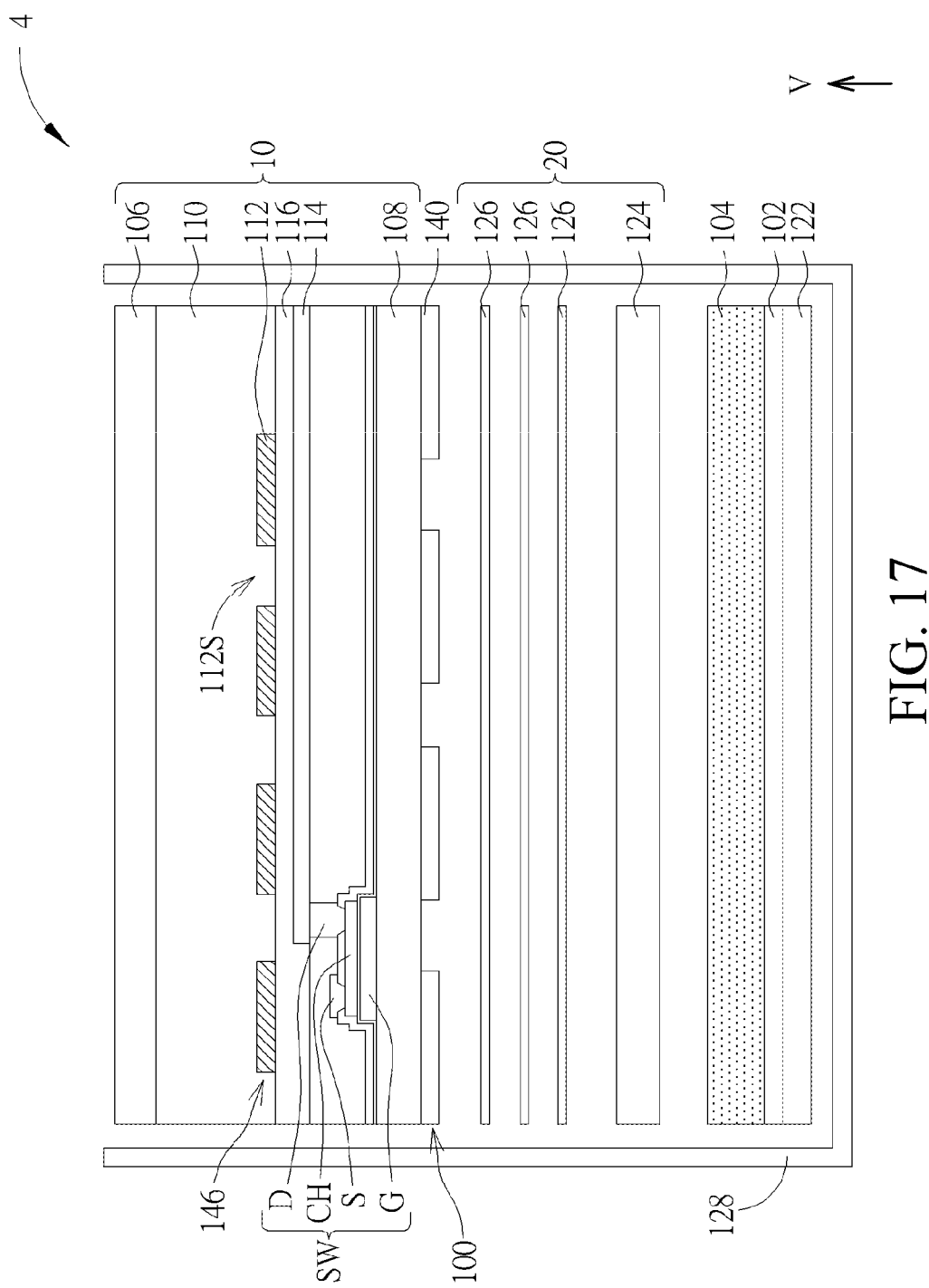
FIG. 17 is a schematic diagram of a display apparatus with touch sensing and force sensing functions according to a fourth embodiment of the present invention.

Referring to FIG. 17, FIG. 17 is a schematic diagram of a display apparatus with touch sensing and force sensing functions according to a fourth embodiment of the present invention. As shown in FIG. 17, this embodiment differs from the first embodiment in that the display apparatus with touch sensing and force sensing functions 4 further includes a second touch device 146, a first touch device 100 disposed outside a display panel 10, and the second touch device 146 is disposed in the display panel 10. Specifically, the first touch device 100 is disposed between a second substrate 108 and an optical sheet 126; the first touch device 100 is formed by another conductive layer 140; the conductive layer 140 may be located on a surface, far away from a first substrate 106, of the second substrate 108; and the conductive layer 140 may be made of a transparent conductive material, such as ITO, but the present invention is not limited thereto. First electrodes 112 of this embodiment may be used as pixel electrodes of the display panel 10 as well as touch sensing pads of the second touch device 146 for detecting a touch position. In other words, the second touch device 146 is integrated with the display panel 10 to form an in-cell (In-cell) touch display panel, but the present invention is not limited thereto. On the other hand, the first touch device 100, an elastic dielectric layer 104 and force sensing pads of a conductive layer 102 (not shown in FIG. 17) form a force sensing device. In other words, the first touch device 100 of this embodiment is used to detect a pressing force rather than a touch position. In addition, the driving method of this embodiment differs from the first embodiment in that the display apparatus with touch sensing and force sensing functions 4 respectively detects a pressing force by using the first touch device 100 and detects a touch position by using the second touch device 146. Specifically, in a force detection period, a common signal is provided to the conductive layer 102, and a force sensing signal corresponding to a pressing force is detected by using the first touch device 100. At this time, because the common signal is input to the conductive layer 102, the force sensing signal transmitted to touch sensing pads 120 of the first touch device 100 is affected by the common signal of the conductive layer 102 and therefore changes. As compared with a state that the conductive layer 102 is in a floating state, the sensitivity of the first touch device 100 to a change of the pressing force when the common signal is provided to the conductive layer 102 is relatively high. In a touch detection period, providing a common signal to the conductive layer 102 is stopped, or the conductive layer 102 is electrically disconnected from a ground terminal, so as to enable the conductive layer 102 to be in a floating state. Besides, at least one touch drive signal is transmitted to the second touch device 146, and at least one touch sensing signal is detected from the second touch device 146. At this time, the conductive layer 102 is in the floating state, and therefore, the conductive layer 102 does not interfere with the signal transmitted on the touch sensing pads of the second touch device 146. Therefore, as compared with a state that the common signal is provided to the conductive layer 102, at this time, the sensitivity of the second touch device 146 to a finger is relatively high. In addition, the first touch device 100 and the second touch device 146 are formed by different conductive layers, and therefore, there is no conflict between signal transmission of the first touch device 100 and signal transmission of the second touch device 146. Therefore, the touch detection period may overlap or may not overlap the force detection period. On the other hand, the features of the foregoing variant embodiments of the first embodiment may be applied to this embodiment.

To sum up, in the display apparatus with touch sensing and force sensing functions of the present invention, the force sensing device is integrated in the display apparatus, so as to avoid increases of size and weight of the display apparatus. Besides, a distance between the conductive layer and the first touch device may be relatively short, and therefore, when the display apparatus is pressed, the distance between the conductive layer and the first touch device changes greatly, so as to detect a force more effectively or sensitively. Moreover, the elastic dielectric layer is disposed between the conductive layer and the first touch device. Therefore, the distance between the conductive layer and the first touch device may be quickly rebounded to an original state after the pressing is finished, so as to avoid an error of a force sensing result that is caused by excessive slow rebounding of the distance between the conductive layer and the first touch device.

The foregoing descriptions are merely exemplary embodiments of the present invention, and equivalent variations and modifications made in accordance with the claims of the present invention shall fall within the scope of the present invention.

What is claimed is:

1. A display apparatus with touch sensing and force sensing functions, comprising:
   a display panel, comprising:

a first substrate;
a second substrate;
a liquid crystal layer disposed between the first substrate and the second substrate;
a gate line disposed on the second substrate;
a data line disposed on the second substrate;
an active component electrically connected to the gate lines and the data lines;
a first electrode disposed between the second substrate and the liquid crystal layer, wherein the first electrode is a touch sensing pad of a second touch device for detecting a touch position;
a second electrode disposed between the second substrate and the liquid crystal layer; and
an insulation layer disposed between the first electrode and the second electrode;
a backlight module;
a first touch device, being located between the backlight module and the second substrate;
a conductive layer, comprising a plurality of force sensing pads, wherein the first touch device overlaps corresponding ones of the force sensing pads, respectively in a vertical projection direction, and wherein the backlight module is located between the force sensing pads, the first touch device and the conductive layer; and
a dielectric layer, disposed between the conductive layer and the first touch device, wherein the first touch device, the dielectric layer and the force sensing pads form a force sensing device.

2. The display apparatus with touch sensing and force sensing functions according to claim 1, wherein the backlight module is located between the conductive layer and the display panel.

3. The display apparatus with touch sensing and force sensing functions according to claim 1, wherein the force sensing device further comprises a flexible board, and wherein the conductive layer is disposed between the dielectric layer and the flexible board.

4. The display apparatus with touch sensing and force sensing functions according to claim 1, wherein the backlight module comprises:
a light guide plate; and
at least one optical sheet, disposed between the light guide plate and the display panel, wherein the light guide plate and the at least one optical sheet are disposed between the display panel and the conductive layer.

5. The display apparatus with touch sensing and force sensing functions according to claim 1, wherein the dielectric layer comprises an elastic dielectric layer, and the elastic dielectric layer comprises an optical clear adhesive (Optical Clear Adhesive, OCA) or a UV glue (UV glue).

6. The display apparatus with touch sensing and force sensing functions according to claim 1, wherein the dielectric layer comprises a gap with a thickness between 50 micrometers and 1000 micrometers.

* * * * *